Jan. 6, 1970

W. E. BUCK ET AL 3,488,102

LASER BEAM SCANNING APPARATUS

Filed March 25, 1966

INVENTORS
WILLARD E. BUCK
THOMAS E. HOLLAND
BY
ATTORNEYS

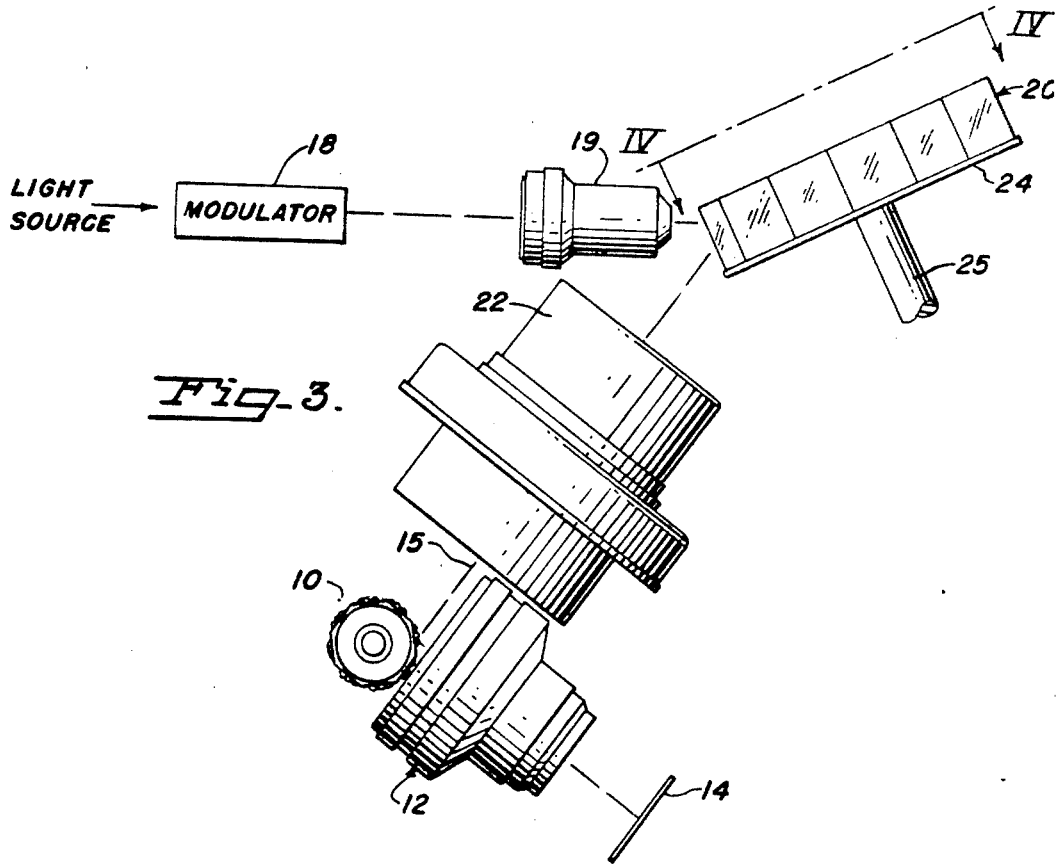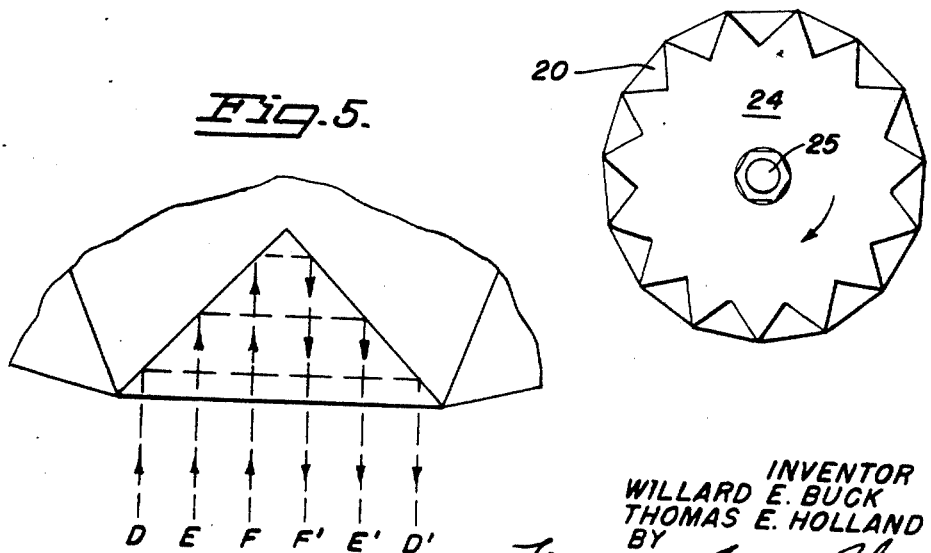

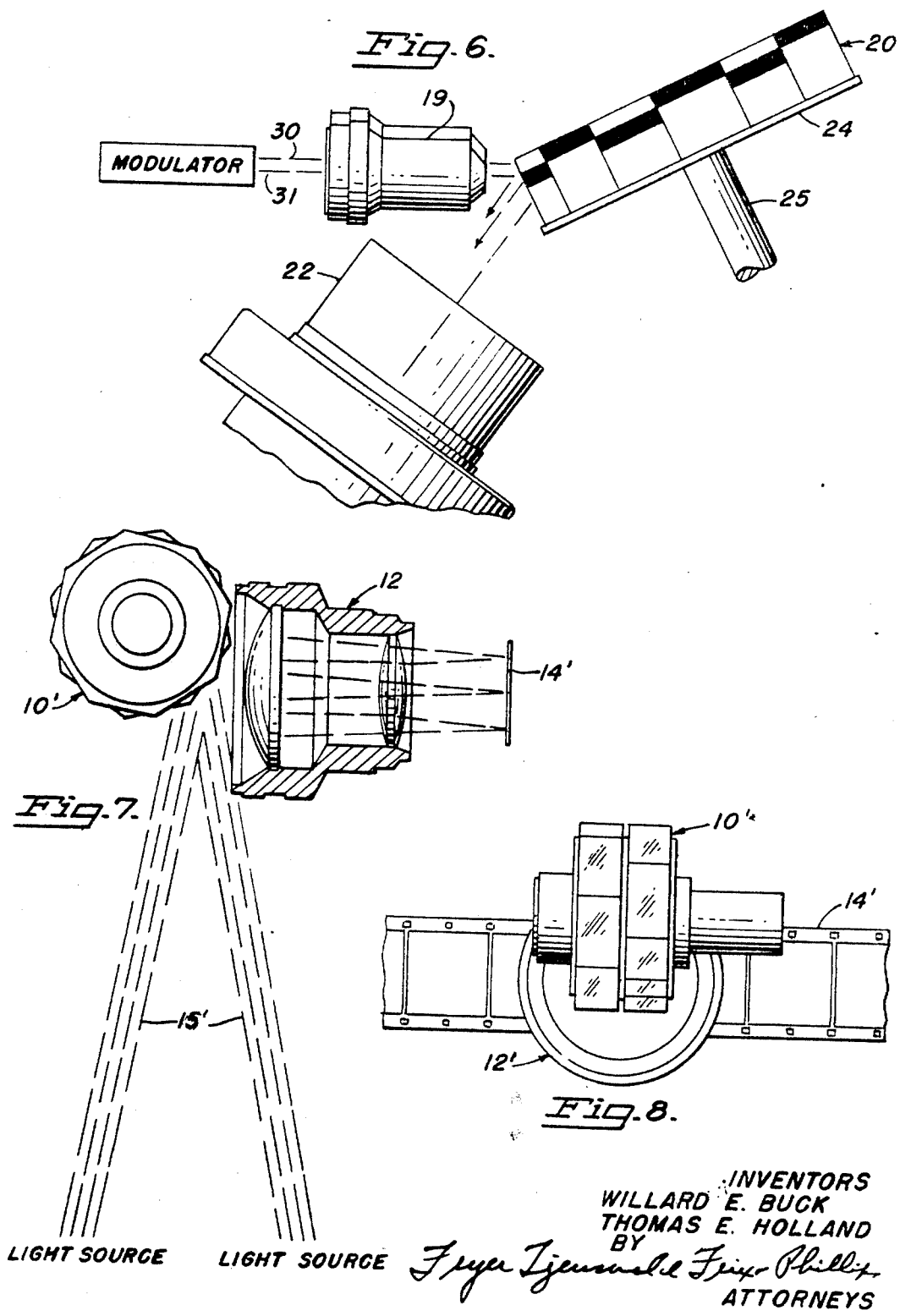

Jan. 6, 1970   W. E. BUCK ET AL   3,488,102
LASER BEAM SCANNING APPARATUS
Filed March 25, 1966   4 Sheets-Sheet 4
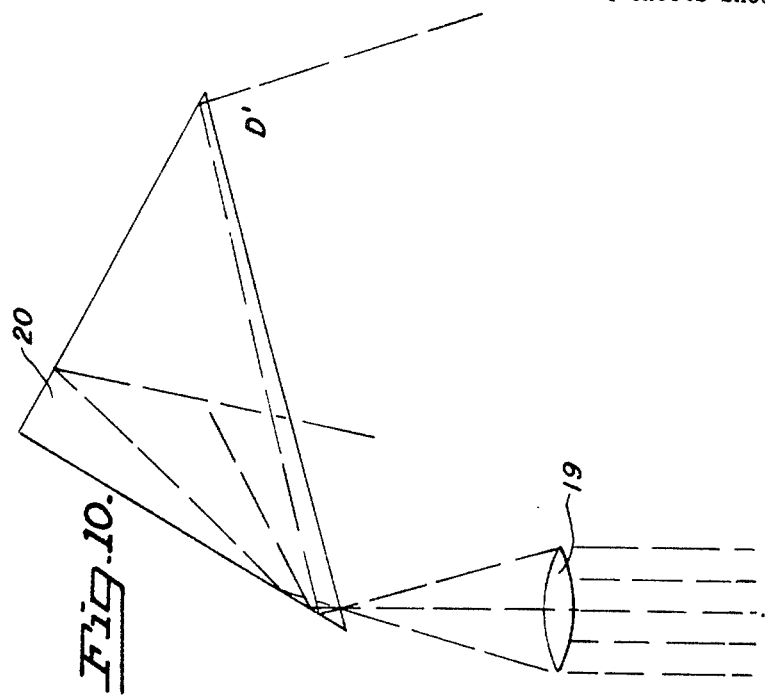
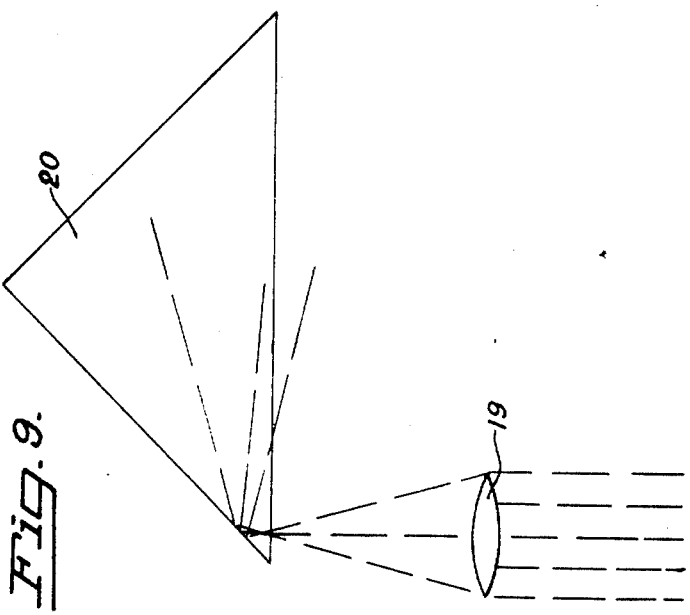
INVENTOR
WILLARD E. BUCK
THOMAS E. HOLLAND
BY
ATTORNEYS

United States Patent Office 3,488,102
Patented Jan. 6, 1970

3,488,102
LASER BEAM SCANNING APPARATUS
Willard E. Buck, Santa Clara, and Thomas E. Holland, Sunnyvale, Calif., assignors, by mesne assignments, to Technical Operations, Incorporated, Burlington, Mass., a corporation of Delaware
Filed Mar. 25, 1966, Ser. No. 537,453
Int. Cl. G02b *17/00;* G02f *1/34;* H04n *3/00*
U.S. Cl. 350—7     3 Claims

ABSTRACT OF THE DISCLOSURE

A laser beam scanning apparatus capable of producing a two-dimensional raster-type scan comprising a chain of mirror pairs mounted for high speed rotation upon the periphery of a driven wheel. A stationary input beam is brought to a focus in the locus of travel of the mirror chain. The effect of moving the mirror pairs through the beam focus is to produce a virtual image of the beam focus which is displaced substantially rectilinearly a distance equal to twice the displacement of the active mirror. A projection lens collects light from the beam focus virtual image to cause the beam to effect an angular scan. Another scanner comprises a plurality of coaxial, polygonal mirror wheels shifted in angular phase to effect a multiplication of the effective scan rate. Apparatus for producing a lace-interlace raster scan useful in television applications is shown.

---

It is an object of the present invention to provide a device or system in which scanning is done with a focused and modulated beam of light as distinguished from an electron beam and in which the scanning beam may be used for exposing a sensitized film to produce a permanent record.

A further object is to provide a device capable of being controlled by a conventional television signal and, more important, capable by converting the conventional "lace and interlace" type of scanning signal to a simplified or order scan for producing a record on film capable of being projected as a distortion free image on a screen with ordinary projection apparatus. The manner in which the invention is accomplished and a basic understanding of the components employed in the system are made apparent in the following specification having reference to the accompanying drawings.

In the drawings:

FIG. 3 is a view illustrating the horizontal scan components of FIG. 1 combined with vertical scan components embodying the present invention;

FIG. 4 is a view in elevation of a rotating mirror component shown in FIG. 3 and taken on the line IV—IV thereof;

FIG. 5 is an enlarged fragmentary view to illustrate the manner in which light passes through one of the mirror prism elements of FIG. 4;

FIG. 6 is a view like FIG. 3 illustrating a modification;

Figure 1:
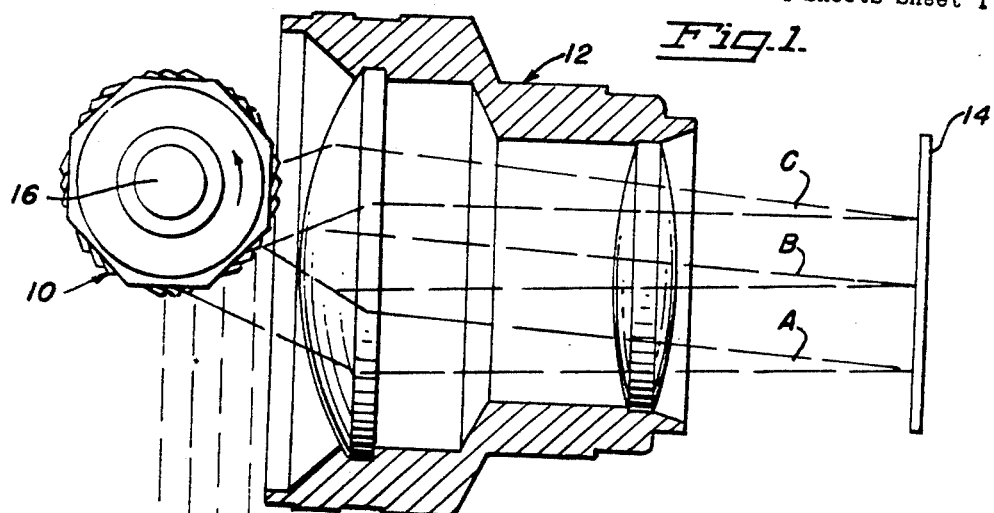
FIG. 1 is a view partially in section and partially in elevation of a mirror and lens system for producing a horizontal scan.
Figure 2:
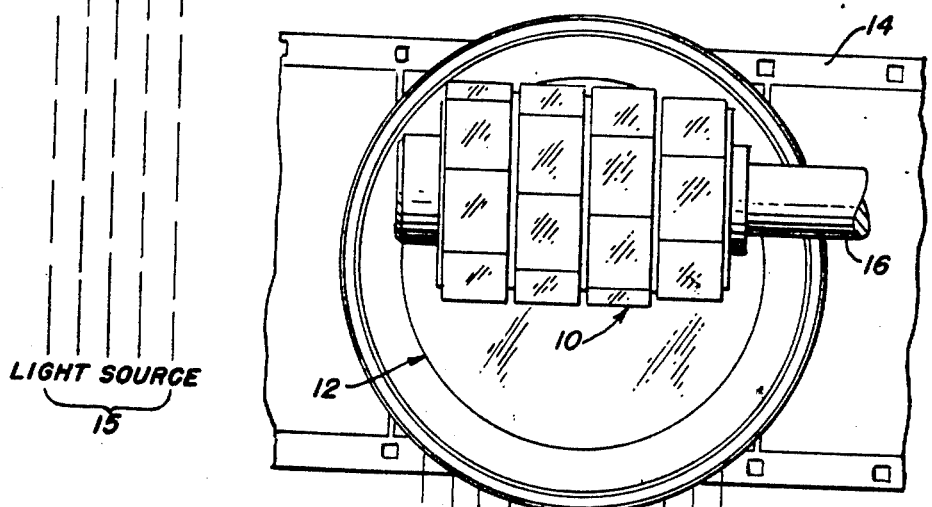
FIG. 2 is a view of the component of FIG. 1 illustrated in elevation as viewed from the left hand side of FIG. 1.

FIGS. 7 and 8 are views comparable to but illustrating modifications of scanning mechanism illustrated in FIGS. 1 and 2; and FIGS. 9 and 10 are schematic views to illustrate the purpose of a special arrangement of reflectors.

Since a raster such as produced on a television screen is made up of lines successively crossing the face of the tube or screen usually in a nearly horizontal direction and progressing across the screen usually in a vertically downward direction, the two motions entering into the production of such a raster will be referred to herein for convenience as a horizontal scan and a vertical scan.

The components of the present system which enter into the production of a horizontal scan are illustrated as a rotatable multi-face mirror, generally shown at 10, and a compound lens system 12 through which a beam of light is focused in successive horizontal traces on a film strip 14. A beam of light from a source, not shown, which has passed through a collimating lens, later to be referred to, is directed toward the rotating mirror 10 to be reflected by its multiple mirror surfaces, one at a time, through the lens 12 and focused thereby at the surface of the film 14. The mirror 10 has 32 reflecting surfaces, formed eight on each of four separate elements for convenience of manufacture and which are all secured to a common shaft 16. The shaft 16 is rotated by suitable power means which in some cases will be a high speed electric motor and in other cases a gas turbine, neither of which is herein illustrated. The mirror sections are so arranged on the shaft 16 that the reflecting surfaces are offset 11°15′ from each other thus dividing the full 360° circle into 32 equal angles of reflection. With this construction, upon rotation of the multi-face mirror, the various faces will one at a time reflect the incoming beam to a scanning sweep across the lens 12 which focuses it upon the sensitized surface of the film 14. Three positions of such a scanning focused beam are shown at *a*, *b* and *c* in FIG. 1. The number and spacing of the mirror faces, the optical angle of the lens and the width of the film are such that each complete scanning of the width of the film by one mirror face is immediately followed by a scan from another mirror face and vertical scanning may be accomplished by longitudinal movement of the film by suitable film drive mechanism (not shown).

The particular configuration of the multi-faced mirror 10 has important advantages. It is obvious that a mirror of the same general size could be formed with thirty-two long narrow mirror faces extending around its periphery. However, since each mirror face determines the configuration of the beam of light reflected by it, it becomes in effect an aperture and the nearly square mirror faces on the present mirror produce a beam having a cross section far better adapted to being focused to a small dot for scanning purposes. Manufacture of the mirror in four separate sections is also simpler than endeavoring to machine and polish all thirty-two surfaces from a single piece of material.

The description so far has related to scanning of the sensitized film capable of being moved. The system of the present invention is capable as will now be described of projecting an image on a screen or any suitable flat surface greatly enlarged for convenience in viewing and to accomplish this, a vertical scan is produced to replace the movement of the film, and the mechanism for producing this vertical scan is illustrated in FIGS. 3 and 4. FIG. 3 shows the same rotating mirror 10 and lens 12 referred to in FIG. 1. The film 14 is also shown but with the vertical scanning mechanism to be described this may be considered as a large screen disposed at a greater distance from the lens. In this figure, light from a source (not shown) passes through a modulator shown at 18 to be focused by a lens 19 at the surface of a circle of prisms which are in effect right angle reflectors indicated at 20, and thence through a collimating lens 22 to produce the collimated beam of light indicated at 15 in FIG. 1 which impinges upon the rotating mirror 10. The reflectors 20 are mounted on a disc 24 supported on a shaft 25 for rotation by suitable power means. Thus the focused beam from the lens 19 is given a scanning motion by each right angle reflector. The nature of this motion can best be understood by reference to FIGS. 5, 9, and 10. In the interest of simplicity, in FIG. 5 the illustrated reflector is assumed to be held stationary and the input beam moved across it. Different positions of the principal ray entering the reflector are represented at D, E and F as entering through the front face, reflected by mirror surfaces on the other faces, and leaving the reflector at positions D', E' and F', respectively. At the nadir of the reflectors, the rays cross and depart to opposite extremes of the reflector. Referring especially to FIGS. 9 and 10, it is seen that the rays exiting from the reflectors 20 appear to come from a virtual image of the focus of lens 19. If ray traces are made to locate this beam focus virtual image for other positions of the reflectors 20 as it moves across the (stationary) input beam, it is manifest that the focus virtual image moves along a locus of travel corresponding to the locus of travel of the reflectors 20. If the reflector motion is rectilinear, so also is the motion of the focus virtual image rectilinear. If the reflector is moved through an arcuate locus, the focus image is likewise arcuate. Collimating lens 22 (see FIG. 3) collects light from the reflectors 20. Thus the reflected beam has a scanning motion from right to left as viewed in FIG. 5 but which will appear on the screen, due to the arrangement of the reflectors in the system, as a vertical downward scan. Remembering that the reflector is in motion and the input beam is stationary, it is realized that as the relative movement of the input beam and a reflector 20 causes a traversal of the beam focus virtual image behind the reflector a distance $d$, the reflector has moved one reflector length. Thus, to an observer at the location of the collimating lens 22, the beam focus virtual image has moved through a distance $2d$. Accordingly, the resultant angular beam deflection is twice what it would be if the reflectors were held stationary and the beam were moved relative thereto. Thus, the light beam modulated, as by a television signal, is caused to pass through a horizontal scan and a vertical scan to produce a raster on the stationary film or screen.

The right angle reflectors 20 are arranged in a circle to move in an arcuate path as they receive light from the lens 19. The reason for this can best be understood by reference to FIGS. 9 and 10 each of which represents the lens 19 and one of the right angle reflectors. The lens 19 serves to focus the incoming light to a point at the surface of the reflectors 20 and at this point the beam diverges until it is received by the collimator 22. Thus it is a diverging beam passing through reflectors 20. As shown in FIG. 9, with the axis of lens 19 normal to the face of the reflector, the beam is not contained and thus not all received by the second reflecting surface. Actually the beam will not emerge from the first surface of the prism which forms the reflector as shown by a broken line but since the angle of incidence with this surface is very small, this portion of the beam will be reflected back into the prism to further complicate the end result. This can be corrected by tilting reflector 20 as shown in FIG. 10 until the entire diverging beam is contained within the prism and reflected by the second surface. Were the reflector of FIG. 10 to be moved in a straight path, as to the left in the drawing, the condition shown in FIG. 9 would prevail to an even greater degree when the beam entered at D' (refer to FIG. 5). However since the reflectors travel an arcuate path about the center of the disc 24 the angle of FIG. 10 is gradually reversed and the same advantage prevails when the beam leaves the prism as prevailed when it entered. The number of right angle reflectors and their angular disposition will vary with different optical systems and angle of beam focus. As an example, one system used in testing produced optimum results with 16 right angle reflectors making a variation of 22½° in their disposition.

The multiple right angle reflectors constitute a repetitive scan device having important advantages. This device, as described herein, provides the vertical scan for a raster and each right angle reflector creates the scan for one frame, starting at the top and continuing to the bottom. In some scanning devices time is required in moving back to the starting position of the next frame or scan. In others the beam of light is split and reflected by separate mirror surfaces so juxtaposed that two scanning beams are caused to follow each other with no dead or fly-back time. Such a scanning device is disclosed in a copending application of Buck and Sherman. Ser. No. 443,529, and has the disadvantage that it reduces the effective intensity of the beam by fifty percent. In the repetitive scan device of the present invention the beam is focused to a very small size at the circle through which the apexes of adjacent right angle reflectors pass. Thus the beam passes from one right angle reflector to the next, or in effect from the bottom of one scanned frame to the top of the next with negligible dead time and negligible loss of light.

In conventional television, two complete scans of each frame are required to prevent noticeable fading or decay of the picture on the fluorescent surface of the picture tube. Briefly stated, the first scan produces every other line from top to bottom of the frame and the second scan fills in the alternate lines. Consequently, whatever decay is taking place in the first lines of the first scan is unnoticed because of the inter-position of the brighter lines of the second scan. This is known as the "lace and interlace" system; the lines of the first scan being referred to as the "lace" and those of the second scan, the "interlace." As a consequence, the printing of a picture on a moving film as in the system shown in FIG. 1 would in effect produce two pictures vertically foreshortened. This would occur because the "lace" would occur in the upper half of the frame and the "interlace" in the lower half of the frame. This would not necessarily be unsatisfactory if the film were to be used only as a record to be read back by a television viewer in which case the "lace and interlace" could, with suitable mechanism, be separated and rearranged to form a proper picture. According to the present invention, however, it is possible to translate the "lace and interlace" pattern to a complete clear picture in each frame either on a film or projection upon a screen.

Referring to FIG. 6, lens 19, mirror prisms 20 and lens 22 are the same as those shown in FIG. 3. However, in this instance, two input beams as represented by arrows 30 and 31 enter and pass through the system, one being a scan of the "lace" signal and one a scan of the "interlace" signal. These beams are parallel and spaced where they impinge the prism mirrors 20 and these mirrors are alternately masked as with black or other opaque pigment on their surfaces so arranged that one mirror reflects the beam 30 and the next mirror the beam 31 and so on alternately and continuously so that the "lace and interlace" are serially produced on the film or screen. The beams 30 and 31 are produced by employing any conventional beam splitter intercepting the signal beam.

Referring back to the description of FIG. 1, it will be recalled that the rotating mirror 10 is described as having four parts each with eight reflecting surfaces to produce thirty-two scans per revolution. The same effect may be obtained, however, in the manner illustrated in FIGS. 6 and 7 wherein the rotating mirror is shown at 10' and those parts of the system corresponding to those of FIGS. 1 and 2 are designated by the same reference characters primed. Here the rotating mirror is made of two parts each having eight reflecting surfaces and the incoming light is divided into two angularly related beams 15" containing the television signal. Obviously, with the proper angular relation between the beams 15' and disposition of the mirror surfaces, thirty-two scans can be obtained to produce the same effect as produced by the thirty-two mirror surfaces of FIGS. 1 and 2. This may even be carried further with four angularly related incoming light beams and a single mirror element with only eight reflecting surfaces.

As is shown in the drawings, each modification of the invention includes a rotating mirror, a film or screen, and means to focus light to a point at the surface of the film or screen. Since the film or screen is preferably flat, or disposed on planar the lens which brings the beam of light to a focus is disposed between the rotating mirror and the screen or film. This takes advantage of the fact that a lens has a focal plane so that it is unnecessary to arrange the film or screen on an arc as is the case when the rotating mirror is between the focusing lens and the screen.

We claim:

1. An optical system for causing an input laser beam to perform a repetitive angular scan comprising:
    a train of cooperating mirror pairs with each pair of mirrors converging in the direction of said input beam forming a line of intersection therebetween the respective lines of intersection of said mirror pairs being in spaced parallel relationship;
    transport means mounting said mirror train for moving said mirror train through said input light beam in a path transverse to said direction of said input beam and transverse to said lines of intersection of said mirror pairs;
    optical image-forming means in said beam for focusing said input beam substantially in said path, movement of said mirror pairs through said beam by said transport means causing an image of said beam focus formed by said mirror pairs as they cross the beam in succession to execute a repetitive one-dimensional scan; and
    lens means for reimaging said beam focus image at an output plane to produce a repetitive one-dimensional spot scan in response to movement of said mirrors in said path.

2. The system of claim 1 wherein said mirrors constituting said mirror pairs are planar and lie in planes forming a dihedral angle of substantially 90°, and wherein said beam focus is located substantially in the locus of travel of the apexes of said mirror pairs.

3. The system of claim 2 wherein said mounting means effects movement of said train of mirrors in a curvilinear path convex to the direction of said input beam.

References Cited

UNITED STATES PATENTS

| | | | |
|---|---|---|---|
| 1,999,867 | 4/1935 | Cawley. | |
| 3,293,655 | 12/1966 | McNaney | 350—7 |
| 3,381,570 | 5/1968 | Anway et al. | 350—6 |
| 3,398,379 | 8/1968 | Sims et al. | 350—6 |
| 2,146,937 | 2/1939 | Cawley | 178—7.6 |
| 2,296,944 | 9/1942 | Okolicsanyi | 178—7.6 |

FOREIGN PATENTS 627,385  2/1936  Germany.

PAUL R. GILLIAM, Primary Examiner

U.S. Cl. X.R.
178—7.6; 350—285